Patented Aug. 24, 1937

2,091,102

UNITED STATES PATENT OFFICE 2,091,102

PIGMENT COLORS AND THEIR PREPARATION

Ferdinand W. Peck, Penns Grove, N. J., assignor to E. I. du Pont de Nemours & Company, Wilmington, Del., a corporation of Delaware No Drawing. Application September 8, 1933, Serial No. 688,700

6 Claims. (Cl. 260—31)

This invention relates to vat colors in a new physical form suitable for use as pigments, more particularly N-dihydro-1:2:2':1'-anthraquinone azine, and a method for the preparation thereof.

It is known that the physical characteristics of vat colors such as, for example, the structure, the state of subdivision, the covering power and the shade, will vary according to the method of preparation and, therefore, the preparation of colors suitable for use as pigments has attained a separate status in the art. Thus, when N-dihydro-1:2:2':1'-anthraquinone azine is prepared by precipitation from its sulfuric acid solution, for example, by drowning in water, a very green shade of blue is obtained. When the same dye is prepared for pigment use by a slow air oxidation of its leuco crystals in a mixing vessel at approximately normal temperatures, as described, for example, by Just et al. in U. S. Patent No. 1,150,863, a totally different form of color is produced than is obtained by the sulfuric acid precipitation process. The shade of the color obtained by slow mixer oxidation of the leuco crystals with air is much redder than that obtained according to the sulfuric acid precipitation process.

The processes described in the art leave much to be desired for the preparation of some colors such as N-dihydro-1:2:2':1'-anthraquinone azine in certain shades and in a form suitable for certain purposes, for instance, paper dyeing. Heretofore, it has been very difficult to obtain this color in the desired shade by the various oxidation or precipitation processes available. When colors are prepared according to prior art processes, such as described by Just et al., the shade and uniformity of particle size are subject to variation from charge to charge and, where certain relatively coarse charges are produced, it is necessary to increase the actual dye concentration to meet the standard pigment strength.

It is an object of this invention to produce vat colors in a new physical form, characterized by a fine state of subdivision, a crystalline structure similar to the structure of the leuco salt of the dye but more finely divided and possessing considerably more covering power and a different shade than obtainable by precipitation of the dye by air oxidation of its solid leuco salt. A further and more specific object is the production of N-dihydro-1:2:2':1'-anthraquinone azine in this new physical form, characterized particularly by the fact that the shade is a substantially redder tint of blue than in a product obtained by precipitating N-dihydro-1:2:2':1'-anthraquinone azine by air oxidation of its solid leuco salt. A still further object is the provision of a new and improved process for the production of pigment colors of the character above described. Other objects will appear hereinafter.

These objects are accomplished according to this invention whereby vat colors in a new physical form are produced by treating a crystalline leuco salt of a vat color, preferably in the form of an aqueous suspension, with an oxidizing agent adapted to promote the formation of the water-insoluble color more rapidly than air. An alkali in insufficient amount to dissolve the leuco crystals may or may not be present during the precipitation of the color.

The invention will be further understood, but is not limited, by the following examples, in which the parts are by weight.

Example I

Nine hundred parts of beta-amino anthraquinone were fused with a mixture of 1010 parts of sodium hydroxide and 3040 parts of potassium hydroxide at a temperature of about 205° C. The fusion mass was drowned in 72000 parts of water. The solid leuco salt of the N-dihydro-1:2:2':1'-anthraquinone Azine A isomer was separated in a pure form and isolated by filtration.

This leuco salt was then suspended in 17000 parts of water at 20° C.–35° C. Approximately 10 parts of sodium hydrosulfite were added while the charge was stirred.

A slurry of about 200–225 parts of sodium meta-nitrobenzene sulfonate in about 250 parts of cold water was then added rapidly to the leuco salt suspension. The charge was stirred and tested for completeness of oxidation of the leuco salt. The insoluble pigment color was isolated by filtering and washing free of all alkali and other soluble compounds both organic and inorganic.

Example II

Four hundred fifty parts of N-dihydro-1:2:2':1'-anthraquinone azine as sold commercially under the trade name Ponsol Blue R was vatted in the usual way with caustic soda and sodium hydrosulfite, the leuco crystals salted out, and isolated by filtering and washing with weak caustic soda solution containing a small amount of sodium hydrosulfite.

The leuco salt thus obtained was suspended in 17,000 parts of water at 20° to 35° C. Ten parts of sodium hydrosulfite were added, serving to remove the air and keep the leuco salt in the reduced state while the charge was stirred.

When the press cake was thoroughly broken up a slurry of 200 parts of sodium meta-nitrobenzene sulfonate in 250 parts of cold water was added rapidly. After the charge had been stirred one-half hour, it was tested for completeness of oxidation of the leuco salt. The insoluble color was isolated by filtering and washing free from alkali and other soluble compounds.

*Example III*

The procedure of Example II was followed except that the slurry of sodium meta-nitrobenzene sulfonate was replaced by a slurry of 215-230 parts of sodium para-nitrotoluene-ortho-sulfonate in 250 parts of cold water. The insoluble color was separated as previously described.

The pigment color obtained by the foregoing procedures is characterized by insolubility in water, slight solubility in boiling nitrobenzene and solubility in alkaline hydrosulfite solution. It is very finely crystalline and appears to be amorphous to the naked eye but microscopic inspection reveals that the structure is similar to that of the leuco salt. Its maximum absorption of light occurs at a wave length less than that of a product obtained by subjecting the leuco salt to mixer oxidation with air in the presence of water and an alkali at approximately normal temperatures as described by Just et al., supra. That is to say, its shade is a much redder shade of blue than the product described by Just et al.

Air oxidation of an alkaline solution of the leuco compound, either hot or cold, produces a much greener shade of blue. Air oxidation by introducing the leuco salt crystals into boiling water produces a color which has a much greener shade of blue than either the above described product or that described by Just et al.

Instantaneous oxidation of the color in the dissolved leuco state by means of sodium meta-nitrobenzene sulfonate also produces N-dihydro-1:2:2':1'-anthraquinone azine in a much greener shade of blue than it is obtained in accordance with the present invention. Likewise, a much greener shade of blue is obtained by precipitation from sulfuric acid.

The particle size of the color is uniform and the covering power good. The shade of color produced is very constant. This is not true when the leuco N-dihydro-1:2:2':1'-anthraquinone azine is oxidized by one of the several air oxidation processes which are known.

The process of the invention is applicable to the production of other vat color pigments than described in the examples. Further examples of vat colors which may be treated in accordance with the process of the invention are: monochloro-N-dihydro-1:2:2':1'-anthraquinone azine, 3:3'-dichloro-N-dihydro-1:2:2':1'-anthraquinone azine, 3:3'-dibromo-N-dihydro-1:2:2':1'-anthraquinone azine, monobromo-N-dihydro-1:2:2':1'-anthraquinone azine, flavanthrone, pyranthrone and halogenated pyranthrones. In general, the process is especially desirable for the production of vat colors, the leuco salts of which are readily obtainable in crystalline state, e. g., by a salting out process.

As previously indicated, the oxidizing agents employed in accordance with the process of the invention are adapted to promote the formation of the insoluble pigment color more rapidly than air. The use of oxidizing agents substantially soluble in the suspension medium as contrasted with air which is substantially insoluble aids in the production of a uniform product.

The amount of oxidizing agent employed is subject to variation but should preferably be sufficient or in excess of the amount required to convert the leuco salt to the insoluble color. In certain cases, an excess of oxidizing agent is undesirable. Thus, in preparing colors of the N-dihydro-anthraquinone azine series, e. g., N-dihydro-1:2:2':1'-anthraquinone azine, by oxidation of the leuco compound, an excess of an oxidizing agent such as sodium peroxide is undesirable, probably due to the fact that the oxidation goes too far and forms the azine derivative.

The preferred oxidizing agents are chosen from the class of aromatic nitro compounds which are water-soluble. Aromatic nitro compounds of the benzene series containing a water solubilizing group such as a sulfonic acid, carboxylic acid, and/or hydroxy group are especially suitable. Further specific examples of suitable oxidizing agents are 1-methyl-4-nitrobenzene-2-sodium sulfonate; 1-methyl-2-nitrobenzene-4-sodium sulfonate; 1-methyl-2-nitrobenzene-6-sodium sulfonate; 1-methyl-6-nitrobenzene-2-sodium sulfonate; the corresponding potassium salts of these compounds; the corresponding nitrobenzoic acids as the sodium or potassium salts; the corresponding nitro-phenolates; and soluble oxidizing salts of the naphthalene and anthracene series.

Especially desirable results are obtained in the use of the nitrosulfonates of the benzene series, and, in particular, sodium-meta-nitrobenzene-sulfonate. An aromatic nitro compound such as sodium-meta-nitrobenzene sulfonate may be used in excess of the theoretical amount required for conversion of the leuco salt of N-dihydro-1:2:2':1'-anthraquinone azine to the insoluble color without substantially affecting the color.

Temperatures below about 35° C. are preferably employed in the oxidation although higher temperatures may be used provided the heat is insufficient to dissolve the solid leuco salt in the suspension medium and the color is not decomposed. The leuco salt may be somewhat soluble in the suspension medium but preferably the concentration of the suspension medium and the nature of the leuco derivative should be such that not more than about 5% of the leuco salt is in solution. The solubility of the leuco salt may be influenced by the presence of salting out agents.

The formation of the color may be effected in the presence of one or more of the following substances: a salting out agent, such as, for example, sodium chloride, or aluminum sulfate; a wetting agent, such as, for example, an abietene sulfonate, or an alkylated naphthalene sulfonate; a dispersing agent, such as, for example, cellulose sulfite waste liquor or an alkali metal caseinate; a protective colloid such as, for example, glue; a substratum, such as, for example, alumina, barytes, silica, clay, talc, asbestos, magnesium carbonate, lithopone, titanium oxide, and zinc oxide; and a binding agent adapted to bind the pigment to the substratum, such as, for example, an aluminum hydroxide floc. Aluminum sulfate may be used to furnish such a floc.

Paper dyeing is ordinarily effected by adding the vat color as a suspension, paste or powder to the paper beater containing the pulp together with aluminum sulfate, glue, sizing and other customary ingredients. The very fine color held up by colloids is thus mixed in with fiber.

One of the advantages of the present invention is the provision of a pigment color such as N-dihydro-1:2:2':1'-anthraquinone azine in a form in which it is suitable for coloring paper in a shade not heretofore attainable by the various oxidation and precipitation processes available. Whereas the shade obtainable by previous processes of the air oxidation type varies widely from charge to charge and, in addition, certain relatively coarse charges may be produced making it necessary to increase the actual dye concentration to meet the standard pigment strength, the shade in the case of colors prepared by the process of the present invention is constant, the physical state substantially uniform, and the state of subdivision unusually fine.

By producing N-dihydro-1:2:2':1'-anthraquinone azine in a greenish shade of blue by a sulfuric acid precipitation process and mixing this with the red shade of blue produced by the oxidation of the leuco salt as herein described, it is possible at all times to meet the standard shade. By having both the green and the red shade of the dye in an extremely finely divided state, it is possible to lower the actual dye content of the product and still equal the standard type in pigment strength. This added pigment strength in a red shade has not heretofore been developed.

As many apparently widely different embodiments of this invention may be made without departing from the spirit and scope thereof, it is to be understood that I do not limit myself to the specific embodiments thereof except as defined in the following claims.

I claim:

1. The process of producing a pigment color which comprises reacting an aqueous suspension of a leuco salt of a vat color of the anthraquinone series with an oxidizing agent belonging to the class of aromatic nitro compounds of the benzene series which are water soluble.

2. The process of producing a pigment color which comprises reacting an aqueous suspension of a leuco salt of a vat color of the anthraquinone series with a water soluble nitro sulfonate of the benzene series.

3. The process of producing a pigment color which comprises reacting an aqueous suspension of a leuco salt of a vat color of the anthraquinone series with sodium meta-nitro-benzene sulfonate.

4. The process of producing a pigment color which comprises reacting an aqueous suspension of a crystalline, alkali metal leuco salt of a vat color of the N-dihydro-1:2:2':1'-anthraquinone azine series with an oxidizing agent belonging to the class of aromatic nitro compounds of the benzene series which are water soluble.

5. The process of producing a pigment color in a very red shade of blue which comprises reacting an aqueous suspension of leuco sodium salt of N-dihydro-1:2:2':1'-anthraquinone azine at a temperature below about 50° C. with sodium meta-nitrobenzene sulfonate.

6. The process involving the combination of steps of fusing beta-amino-anthraquinone with a caustic alkali, separating the leuco crystals of N-dihydro-1:2:2':1'-anthraquinone azine, and reacting the separated crystals in aqueous suspension with sodium meta-nitrobenzene sulfonate.

FERDINAND W. PECK.